Sept. 14, 1965 — R. A. KEECH — 3,205,549
CLOTHES FASTENER
Filed Dec. 11, 1963
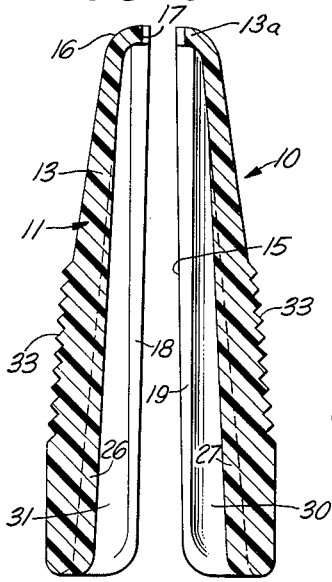
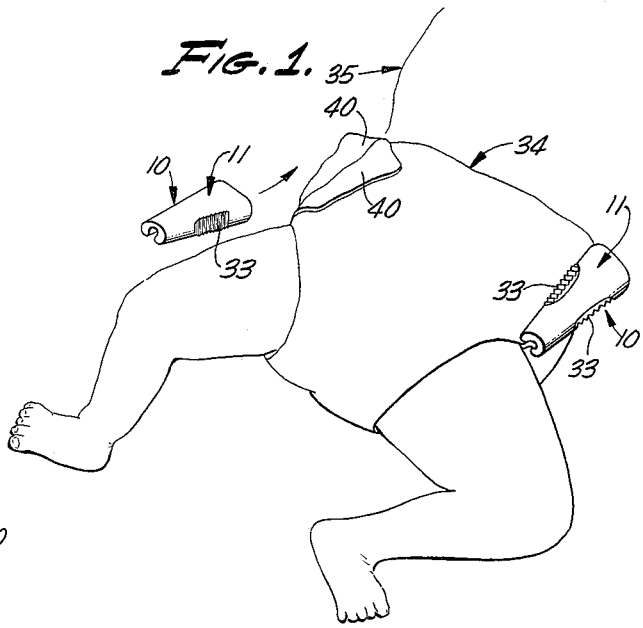
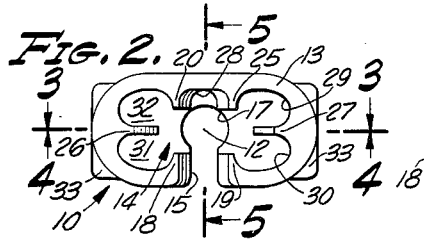
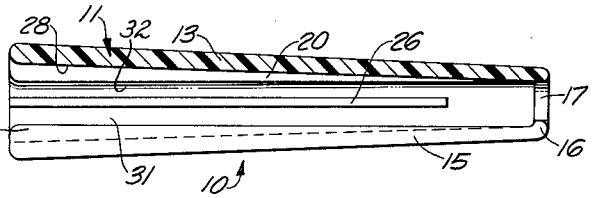
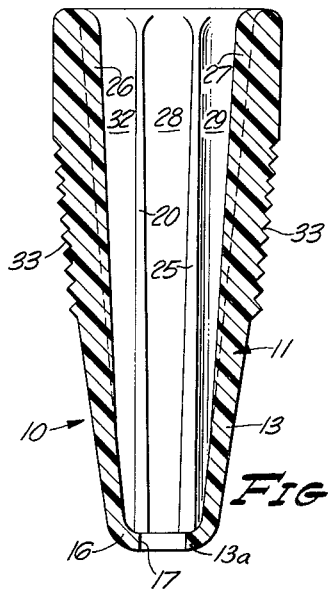
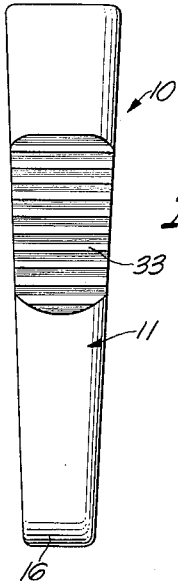
ROGER A. KEECH
INVENTOR.
BY
ATTORNEY

United States Patent Office 3,205,549
Patented Sept. 14, 1965

3,205,549
CLOTHES FASTENER
Roger A. Keech, Glendale, Calif., assignor of one-half to Dana E. Keech, Santa Ana, Calif.
Filed Dec. 11, 1963, Ser. No. 329,649
2 Claims. (Cl. 24—264)

This invention relates to clothes fasteners and more particularly to devices for securing diapers on infants.

The well-known "safety pin" has for generations been the most popular of all the clothing fasteners put on the market for holding swaddling clothes in place. Its virtues notwithstanding, however, the safety pin can be inadvertently opened by pulling on the diaper secured together thereby and this not infrequently results in serious injury to infants. Safety pins also seem to offer a fatal attraction to babies, judging from the number of cases where they have swallowed these pins, sometimes closed but often unclosed so that surgery is required for their removal.

It is an object of the present invention to provide a device which will rival the common safety pin in effectiveness and ease of application and removal, when used as a diaper fastener, but which will be free from the hazards above noted which are inherent in the use of safety pins around infants.

Another object of the invention is to provide a simple sliding fastener which can be inexpensively molded from plastic material and which is particularly adaptable to serving as a fastener for diapers.

The manner of accomplishing the foregoing objects as well as further objects and advantages will be made manifest in the following description taken in connection with the accompanying drawings in which FIG. 1 is a diagrammatic perspective view of a pair of diaper fasteners embodying the present invention after one of these has been applied to secure together two adjacent corners of a diaper on an infant, with the other fastener positioned to illustrate the manner in which this is to be applied in fastening together the other two corners of the diaper.

FIG. 2 is an enlarged end elevational view of the larger end of a fastener comprising a preferred embodiment of the invention, with the same drawn to a scale of approximately 2–1.

FIG. 3 is a longitudinal sectional view of the invention taken on the line 3—3 of FIG. 2.

FIG. 4 is a longitudinal sectional view of the invention taken on the line 4—4 of FIG. 2.

FIG. 5 is a longitudinal sectional view of the invention taken on the line 5—5 of FIG. 2.

FIG. 6 is a side elevational view of the invention.

Referring specifically to the drawings, the invention is there shown as embodied in a clothes fastener 10 which is preferably injection molded from a plastic material such as polystyrene, said fastener comprising a tapering tubular shell member 11 which is ellipsoidal in cross section and is relatively symmetrical about longitudinal axial planes represented by lines 3—3 and 5—5 which are disposed at right angles to each other and intersect in a line 12 which may be referred to as the longitudinal axis of the clothes fastener 10.

The member 11 embodies a wall 13 which encloses a fabric compressing chamber 14 which partakes generally of the tapering shape of the tubular member 11 and the ellipsoidal cross section of the latter. Formed lengthwise in the tubular member 11 in one of the flatter portions of the wall 13 thereof and symmetrical with axial plane 5—5 is a slot 15 the edges of which taper in the same direction as the tubular member 11. At the smaller end of the tapering tubular member 11, the wall 13 curves inwardly to form an inturned lip 13a which provides a nose 16 on this end of said member, said nose having a central hole 17 with which the narrower end of slot 15 connects.

Formed integrally with the member 11 and extending inwardly from the inner surface of wall 13 into chamber 14 is a series of six internal ribs 18, 19, 20, 25, 26 and 27 having relatively narrow inwardly turned faces which are arranged respectively in three pairs of ribs, each pair lying approximately in the same plane with each other and in opposed edgewise relation on opposite sides of one of the axial planes 3—3 and 5—5. Ribs 18 and 19, for instance, are formed inwardly from the wall 13 directly adjacent opposite edges of slot 15 and these ribs pair up with ribs 20 and 25 respectively which extend inwardly from the opposite portion of the wall 12 so that the ribs 20 and 18 are disposed in co-planar, opposed relation as one of said pairs and the ribs 19 and 25 are disposed in co-planar opposed relation as another of said pairs of ribs. Ribs 26 and 27 are formed inwardly from relatively widely opposed portions of the wall 13 so as to both lie in plane 3—3 and are symmetrically disposed with relation to each other on opposite sides of the plane 5—5.

As clearly shown in FIG. 2, the series of ribs above described divide the chamber 14 into five pockets 28, 29, 30, 31 and 32.

It is to be noted that the opposed edge faces of aligned pairs of the internal ribs above described are disposed in converging relation to each other but that the angle of such convergence is less than the angle of internal taper of those portions of chamber 14 in which said particular pairs of ribs are disposed. This results in the inner edges of said ribs merging with the inner surface of said chamber either at or near the smaller end of shell member 11. It is also to be noted that edge faces of ribs 18 and 19 which lie alongside the edges of slot 15, become wider as ribs 18 and 19 approach the smaller end of the clothes fastener 10.

Formed outwardly on the member 11 in symmetrical relation with axial plane 3—3, are serrated gripping sections 33 which assist in obtaining a firm grip between the fingers and the fastener 10 when manipulating the latter in applying in to and removing it from a garment.

Operation

The manner of using a pair of clothes fasteners 10 for fastening a diaper 34 on an infant 35 is diagrammatically illustrated in FIG. 1. The operation begins by properly positioning the diaper between the legs and around the body of the infant and with the four corners 40 of the diaper brought together in two pairs alongside the hips of the infant as shown in FIG. 1 with the corners of each pair turned outwardly. Each of these pairs of diaper corners is held together by the fingers of one hand while one of the clothes fasteners 10 is held in the other hand and shifted in the direction of the arrow 41 so that the pair of the corners 40 so held together are inserted in the large end of the chamber 14 of the fastener 10. The fastener is then further pulled lengthwise over this pair of corners 40 until the fabric comprised in said diaper corners is packed into the chamber 14 so as to compress the same within the area comprehended by the inner edges of ribs 18, 19, 20, 25, 26 and 27 and into the pockets formed therebetween. The pressure thus produced between said rib edges and said diaper corners is adequate to retain said diaper corners from being pulled broadside outwardly through the slot 15 of said clothes fastener 10. The lip 13a at the smaller end of the shell 11 obstructs withdrawal of the diaper in that direction and thus assists in solidly compacting the diaper in the fastener 10. In FIG. 1, one of the fasteners is shown as already having been applied in the manner above described to the two corners 40 of the diaper 34 at the left hip of the infant while the clothes fastener 10 illustrated at the right side of the infant is in the process of being applied to the corners 40 adjacent thereto.

When the clothes fasteners 10 have been applied to diaper 34 as above described, they tend to remain in closing relation with said diaper until a substantial axial pressure is applied to said fasteners by gripping the gripping sections 33 thereof between the fingers and pulling the fastener length-wise out of engagement with the corners 40 in the opposite direction from that by which they had been packed tightly together inside the chamber 14 of said fastener.

The provision within the locking chamber 14 of the fastener 10 of relatively few internal ribs 18, 19, 20, 25, 26 and 27 which divide said chamber into a few relatively deep pockets 28, 29, 30, 31 and 32, produces what may be termed a "labyrinth interlock" within which folds of the corner portions 40 of the diaper 34 become wedged by application of a fastener 10 thereto as shown in FIG. 1.

The inturned lip 13a provided on the shell member 11 at its smaller end, serves the important functions of (1) strengthening that end of said shell against its being split by the packing of fabric therein and, (2) resisting and retarding the escape of said fabric from said end of the fastener.

While only a single embodiment of the present invention has been illustrated and described herein, it is to be understood that this is for illustrative purposes only and that various changes and modifications might be made in this without departing from the spirit of the invention or the scope of the appended claims.

What is claimed is:

1. A molded plastic fastener comprising a hollow shell which is tapered lengthwise and has an ovaloid, flattened cross-section providing said shell with two walls having relatively flattened portions opposed to each other at opposite ends of the minor axis of said cross-section, a longitudinal slot being provided in one of said walls symmetrically dividing the same throughout its length for admitting fabric into said shell, said slot being flared at the larger end of said shell; and rib means including ribs extending into said shell in longitudinal opposition, said ribs extending substantial distances inwardly from said shell at the larger end of said shell, said distances gradually decreasing towards the smaller end of the shell, said ribs being relatively few in number and spaced far enough apart to divide the interior of the larger end portion of the shell into a few relatively deep pockets into which said fabric expands as said fabric is shifted toward and into said flared end of said slot and then lengthwise of the latter with substantial force so as to jam said fabric between adjacent ribs thereby locking said fabric in said fastener.

2. A fastener as recited in claim 1 wherein the smaller end of said shell is provided with inwardly turned lip means to resist and retard the escape longitudinally of fabric from the smaller end of said shell when said fabric has been compacted within said shell.

References Cited by the Examiner

UNITED STATES PATENTS

| 92,715 | 7/69 | Gardner | 24—137 |
|---|---|---|---|
| 2,533,539 | 12/50 | Vivian. | |
| 3,002,240 | 10/61 | Laguerre | 24—30.5 |

FOREIGN PATENTS

| 627,975 | 8/49 | Great Britain. |
|---|---|---|
| 703,569 | 2/54 | Great Britain. |
| 437,225 | 6/48 | Italy. |

DONLEY J. STOCKING, *Primary Examiner.*